Patented Sept. 19, 1950

2,522,798

UNITED STATES PATENT OFFICE 2,522,798

METHOD OF GROWING BEAN SPROUTS

David T. Persha and Jeno F. Paulucci, Duluth, Minn.

No Drawing. Application April 21, 1947, Serial No. 742,976

4 Claims. (Cl. 47—14)

This invention relates to the growing of bean sprouts for human consumption which is now being practiced quite extensively in different parts of the country.

The universal ambition of all growers of such commodity and one of the principal objects of the instant invention is to produce as high quality of product as possible as rapidly as possible as the saving of time during the growing process is of vital economic importance as well as being directly coincident with the delectability of the product: the less time taken during the growing of the sprouts to a predetermined volume, the more tender and delicious they are.

Another object sought is to increase the yield which has been found to be as much as 30% greater by the practice of the instant invention while shortening the growing period which is normally five to seven days to about three days and reducing spoilage to a negligible amount.

Sanitation is another vital requisite not properly practiced or timed so far as is generally known or appreciated and the necessity of starting right for optimum results is one of the primary objects sought by practice of the instant invention.

Other objects and advantages will appear as the description of the invention proceeds.

No drawings are deemed necessary as the essential steps in the practice of the invention may be carried out irrespective of the specific kind of receptacle employed.

The first step, and one of the most vital, is that the seed beans to be sprouted are washed in pure clean water at a temperature of 50° to 75° F. until the water draining therefrom carries no foreign matter or color whatever.

After thoroughly washing the beans, they are placed in a preferably round soaking tank equipped with a cone-shaped bottom of 60° slope and having a suitable gate valve in the cone bottom. The beans are covered with water and a 0.1% concentration of formaldehyde is added. After soaking thirty minutes at 90° F. the tank is drained and potable water is added at 90° F. and this temperature is maintained for two hours. The tank is again drained and fresh water added at 90° F. and repeated at such intervals until the beans have doubled their original weight and volume. The pH of the water at this point should be above 6.0.

In soaking the beans the water should be drained off three or four times and replaced with fresh water. This prevents the accumulation of $CO_2$ gas in the soaking vat which gas will replace oxygen in the water, setting up conditions for anaerobic bacteria to grow, causing bacterial contamination of the beans.

The soaking period may be different for every particular lot of beans, and the time required at 90° F. to achieve a 100% gain in weight will vary accordingly.

Aeration of the soaking water and beans will help to counteract anaerobic bacterial action, and can be achieved by bubbling air into the bottom of the soaking tank and up through the mass of beans.

After a gain in weight of 100% is noted the beans are ready to be planted in the sprouting vat or bed where they are subjected to progressive intermittent watering. The planting of the beans comprises spreading a thin layer, two to six inches, of the soaked beans in the bottom of any suitable sprouting vat and covering said vats with a damp cloth of some porous material that permits the exchange of oxygen and carbon dioxide from the atmosphere and the bed. This cover serves to regulate the rate of respiration of the growing sprouts and also prevents the discoloration of the cotyledons of the beans which are photosensitive and turn color in the presence of light.

After the beans are planted for four hours they are watered at a temperature of 85° F. for as long a period as is required to bring the temperature of the bed equal to that of the water being used. Very little heat is generated in the bed between waterings during the first day of sprouting, the bed temperature seldom will exceed 95° F. The watering is continued for twenty-four hours at four hour intervals, it being determined that the first day of sprouting will require six applications of water at 85° F.

During the second day of sprouting under the conditions outlined, the bed temperature will increase, and to prevent it from getting too high, a cooler watering temperature is used. It has been determined that watering should be continued at a temperature of 80° F. at intervals of four hours with the result of keeping the temperature of the bed within the desired limits.

The third day bed temperatures are still higher and then the sprouts are maturing rapidly. In order to control the bed temperature and the sprout development a watering temperature of 75° F. is used and continued at intervals of four hours thus requiring approximately eighteen waterings to complete the finished product. The bed temperature during this third day should not exceed 110° F.

Bacteria are present in the bed, and these will multiply rapidly if $CO_2$ content becomes too high and/or if temperature conditions promote incubation. $CO_2$ gas lowers the pH of the bed and creates ideal conditions for anaerobic types of bacteria to cause souring of the beans. High bed temperatures also tend to promote decomposition. By using sufficient water the bed temperature is regulated and $CO_2$ gas is washed out.

Watering too often or at too low a temperature cuts down respiration of the sprouts and inhibits quick natural development. Not watering often enough or using water of too high a temperature will allow bacteria to thrive in the bed due to the presence of high concentrations of $CO_2$ and ideal incubation temperatures. Thus, the temperature chosen and watering intervals have been adapted after considerable experimentation and deliberation.

While growing the beans a relative humidity of 40% is maintained in the room, and the air in the room is changed above five times each hour, these conditions having been found to be ideal for the process.

It should be here noted that the character of the water used in producing sprouts is of vital importance, as the presence of iron in the water will cause darkening of the hulls as well as the cotyledon, and the presence of alkaline salts such as calcium hydroxide, calcium oxide, or sodium carbonate in the water will also be injurious in that they seem to burn the sprouts.

The herein described method of growing bean sprouts results in a tender, delectable full grown product in just 3 days whereas ordinary methods require 5 to 7 days and do not seem to compare with the results of the instant process. The instant sprouts are more tender, the loss due to spoilage is far less, and the yield is about 30% higher than with ordinary methods.

Having thus described our invention, what we claim is:

1. The process of growing bean sprouts which comprises soaking seed beans until they have approximately doubled their weight, planting said beans in a sprouting vat, and regulating the temperature of the beans while sprouting by watering same at four hour intervals with the temperature of the water at substantially 85° F. during the first twenty-four hours and progressively reducing the temperature of the water substantially 5° F. for the watering during each successive twenty-four hours.

2. The method of growing bean sprouts which consists of soaking seed beans until they have doubled their weight, planting the soaked beans in a sprouting vat, and regulating the temperature of the beans while sprouting by watering same at four hour intervals with water at a temperature of 85° F. for the first twenty-four hours, at 80° F. for the second twenty-four hours, and at 75° F. for the next twenty-four hours.

3. The method of growing bean sprouts which consists of soaking seed beans until they have doubled their weight, planting the soaked beans in a covered sprouting vat, and regulating the temperature of the beans while sprouting by watering same at four hour intervals with water at a temperature of 85° F. for the first 24 hours, at 80° F. for the second twenty-four hours, and at 75° F. for the next twenty-four hours until the temperature of the beans is the same as the temperature of the water being used.

4. The method of growing bean sprouts which comprises soaking seed beans until they have substantially doubled their weight, planting the soaked beans in a covered sprouting vat, and regulating the temperature of the beans while sprouting by watering same at four hour intervals with water at a temperature of substantially 85° F. for the first twenty-four hours, at substantially 80° F. for the second twenty-four hours, and at substantially 75° F. for the next twenty-four hours until the temperature of the beans is substantially the same as the temperature of the water being used.

DAVID T. PERSHA.
JENO F. PAULUCCI.

REFERENCES CITED

The following references are of record in the file of this patent:

Popular Mechanics, vol 79, pp. 78, 79, published January 1943.

McCay: "Sprouted Soy Beans," published by Cornell Univ. School of Nutrition in April 1943, pp. 2, 3.